(12) United States Patent
Hughes

(10) Patent No.: US 10,093,241 B2
(45) Date of Patent: Oct. 9, 2018

(54) TRUNK MOUNTED STORAGE RACK FOR SPORT UTILITY VEHICLES

(71) Applicant: Gary W. Hughes, La Porte, IN (US)

(72) Inventor: Gary W. Hughes, La Porte, IN (US)

( * ) Notice: Subject to any disclaimer, the term of this patent is extended or adjusted under 35 U.S.C. 154(b) by 0 days.

(21) Appl. No.: 15/894,922

(22) Filed: Feb. 12, 2018

(65) Prior Publication Data

US 2018/0229663 A1 Aug. 16, 2018

Related U.S. Application Data

(60) Provisional application No. 62/457,950, filed on Feb. 12, 2017.

(51) Int. Cl.
| | |
|---|---|
| *B60R 7/02* | (2006.01) |
| *B60R 7/08* | (2006.01) |
| *B60R 5/04* | (2006.01) |
| *A47B 47/00* | (2006.01) |
| *B60R 7/00* | (2006.01) |
| *B60R 11/00* | (2006.01) |

(52) U.S. Cl.
CPC ............... *B60R 7/08* (2013.01); *B60R 7/005* (2013.01); *B60R 7/02* (2013.01); *A47B 47/0083* (2013.01); *A47B 47/0091* (2013.01); *B60R 5/044* (2013.01); *B60R 2011/0036* (2013.01); *Y10S 224/925* (2013.01)

(58) Field of Classification Search
CPC .. B60R 7/00; B60R 7/02; B60R 7/005; B60R 7/04; B60R 7/08; B60R 2011/0003; B60R 2011/0036; B60R 5/00; B60R 5/003; B60R 5/04; B60R 5/044; B60R 5/047; A47B 43/00; A47B 43/0083; A47B 43/0091; Y10S 224/925

USPC ..... 224/539, 542, 925; 296/37.16; D12/424, D12/425; 211/134–153; 108/44
See application file for complete search history.

(56) References Cited

U.S. PATENT DOCUMENTS

| | | | | |
|---|---|---|---|---|
| 4,940,150 A | * | 7/1990 | Spengler | A47B 87/0223 211/133.1 |
| D312,604 S | * | 12/1990 | Barnes | D12/424 |
| 5,031,769 A | * | 7/1991 | Shea | B25H 3/022 206/335 |
| 5,573,125 A | * | 11/1996 | Denny | A47B 96/00 160/84.01 |
| 5,601,198 A | * | 2/1997 | Reed | A47B 96/02 211/180 |
| 5,685,470 A | * | 11/1997 | Moore | B60R 7/005 224/567 |
| D392,938 S | * | 3/1998 | Sylvester | D12/426 |

(Continued)

*Primary Examiner* — Justin Larson

(57) ABSTRACT

A trunk mounted storage rack for sport utility vehicles (SUV) securely restrains grocery bags and prevents damage to fragile items contained therein. The trunk mounted storage rack includes a top shelf, a center shelf, a bottom shelf, an upper support frame, a center support frame, a lower support frame, a safety net, and a top-level barrier. The top shelf, the center shelf, and the bottom shelf are sized to closely fit in the trunk of the SUV. The center support frame suspends the top shelf over the center shelf. Similarly, the lower support frame suspends the center shelf and the top shelf over the bottom shelf. The upper support frame allows the top-level barrier and the safety net to mount onto the top shelf. The safety net prevents grocery bags from falling out of the back of the top shelf, the center shelf, and the bottom shelf.

20 Claims, 8 Drawing Sheets

(56) References Cited

U.S. PATENT DOCUMENTS

| | | | | |
|---|---|---|---|---|
| 5,791,501 A * | 8/1998 | Baldwin, Jr. | A47B 97/00 | 108/27 |
| 5,984,121 A * | 11/1999 | Cole | B65G 1/02 | 211/183 |
| D426,512 S * | 6/2000 | Ciuba | D12/425 | |
| 6,155,621 A * | 12/2000 | Nishida | B60R 21/06 | 280/749 |
| 6,178,896 B1 * | 1/2001 | Houk, Jr. | A47B 87/0223 | 108/157.13 |
| D439,769 S * | 4/2001 | Prince | D6/677.1 | |
| 6,345,944 B1 * | 2/2002 | Florence | B60P 7/0876 | 410/118 |
| 6,386,412 B1 * | 5/2002 | Konechne | B60R 7/04 | 224/275 |
| 6,609,621 B2 * | 8/2003 | Denny | A47B 47/021 | 211/180 |
| 6,619,490 B2 * | 9/2003 | Calleja | A47F 5/01 | 211/180 |
| 6,629,726 B2 * | 10/2003 | Johnston | B60N 3/004 | 297/188.06 |
| 6,698,604 B2 * | 3/2004 | Denny | A47B 47/021 | 182/138 |
| 6,722,512 B2 * | 4/2004 | Scully | A47F 5/13 | 211/175 |
| D493,047 S * | 7/2004 | Moon | D6/675.1 | |
| D509,178 S * | 9/2005 | Panasewicz | D12/425 | |
| 6,942,269 B2 * | 9/2005 | Mains | B60N 3/001 | 108/44 |
| 7,014,053 B2 * | 3/2006 | Calleja | A47F 5/01 | 182/138 |
| 7,191,907 B2 * | 3/2007 | Conway | A47B 47/027 | 182/138 |
| D549,154 S * | 8/2007 | Panasewicz | D12/424 | |
| D553,555 S * | 10/2007 | Panasewicz | D12/425 | |
| 7,401,716 B2 * | 7/2008 | Svenson | B60R 5/045 | 224/42.32 |
| 8,651,351 B2 * | 2/2014 | Fowler | B60R 5/04 | 224/281 |
| 8,763,871 B2 * | 7/2014 | Lucas | B60L 11/1877 | 224/495 |
| 8,876,184 B2 * | 11/2014 | Lucas | B60R 7/043 | 296/24.44 |
| 9,211,010 B1 * | 12/2015 | Nagy | A47B 96/00 | |
| 9,538,846 B2 * | 1/2017 | Reinhart | A47B 96/02 | |
| 2002/0148799 A1 * | 10/2002 | Denny | A47B 47/021 | 211/186 |
| 2005/0103736 A1 * | 5/2005 | Calleja | A47B 47/021 | 211/189 |
| 2007/0187349 A1 * | 8/2007 | Calleja | A47B 47/021 | 211/189 |
| 2015/0351543 A1 * | 12/2015 | Nagy | A47B 96/00 | 211/134 |
| 2016/0120338 A1 * | 5/2016 | Nagy | A47B 96/00 | 211/153 |

* cited by examiner ly relates to trunk mounted
TRUNK MOUNTED STORAGE RACK FOR SPORT UTILITY VEHICLES The current application claims a priority to the U.S. Provisional Patent application Ser. No. 62/457,950 filed on Feb. 12, 2017.

FIELD OF THE INVENTION

The present invention generally relates to trunk mounted storage rack for a sport utility vehicle. More specifically, the present invention utilizes a top shelf, a center shelf, and a bottom shelf to separate grocery bags containing heavy items from grocery bags containing fragile items that can get easily damaged.

BACKGROUND OF THE INVENTION

The present invention is designed and manufactured to custom fit the space between the rear seats and the rear door above the back bumper of sport utility vehicle (SUV). The present invention addresses the problem of haphazard stacking of grocery bags on top of each other, causing fragile items to be crushed under heavy items. This also ruptures the grocery bags and flings groceries out of the rear door when the rear door is opened.

With the present invention, someone could conveniently place bags full of groceries on a set of shelves, which is sized to fit wall-to-wall in the trunk of the SUV, eliminating the possibility of them falling out of the front, back, or sides of the shelves. The top shelf has a clear plastic barrier to prevent anything from falling into the back seat. Realistically, items will shift on the drive home, so injuries and damage to items falling out can be avoided with a safety net that hooks onto the back of the shelves.

The shelves would be strong enough to accommodate most other items, in addition to groceries, that might be placed on them. Preferably, the shelves are made of recyclable plastic. The shelves have an upward-facing edge that increases rigidity and aids in containing items placed on the shelves. The upward-facing edge also contains liquid spills within the shelf until the shelf is removed to be hosed clean.

The present invention may come in different sizes and shapes to fit different brands of SUVs. Since there are so many models and brands of SUVs, all models of SUVs which have similar shaped spaces behind the rear seat would be served by a single type of shelf. All pertaining SUV models would be mentioned on the shelf packaging. As an added option, a platform allows a slide-out removable cooler for refrigerated items to be mounted on the bottom-most shelf. The platform raises the cooler above the upward-facing edge, allowing the cooler to be easily slid off and on the shelf.

DETAILED DESCRIPTION OF THE INVENTION

All illustrations of the drawings are for the purpose of describing selected versions of the present invention and are not intended to limit the scope of the present invention.

Figure 1:
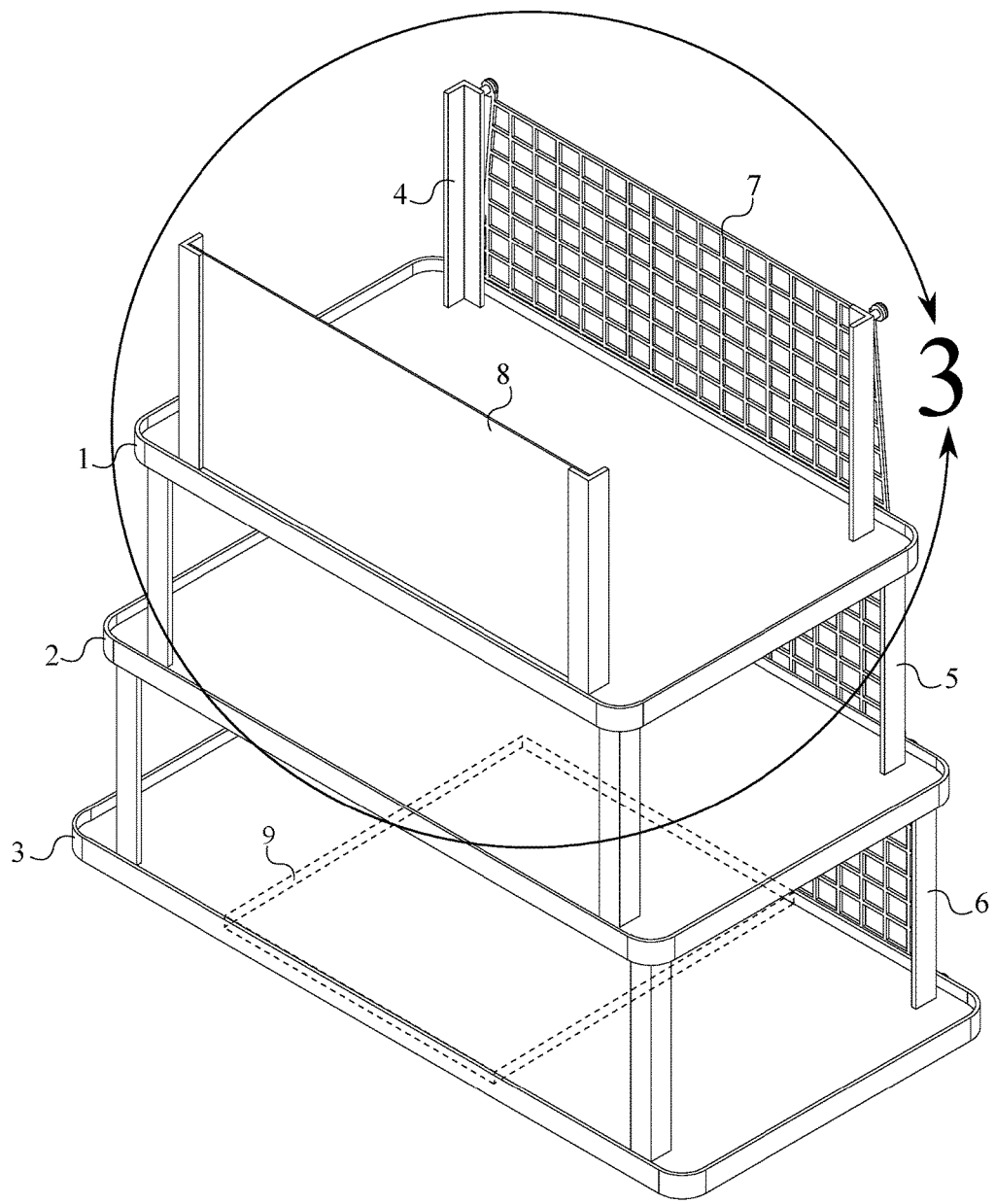
FIG. 1 is a top perspective view of the present invention.

The present invention is a trunk mounted storage rack for a sport utility vehicle (SUV). The present invention securely palletizes grocery bags placed in the trunk of the SUV, preventing bags with heavy items from crushing bags that contain fragile items. Referring to FIG. 1, the preferred embodiment of the present invention comprises a top shelf 1, a center shelf 2, a bottom shelf 3, an upper support frame 4, a center support frame 5, a lower support frame 6, a safety net 7, and a top-level barrier 8. Preferably, the bottom shelf 3 is sized to fit between back seats and the rear door of the SUV. This utilizes all of the available trunk space and maximizes the amount of grocery bags that can be placed on the bottom shelf 3.

Figure 2:
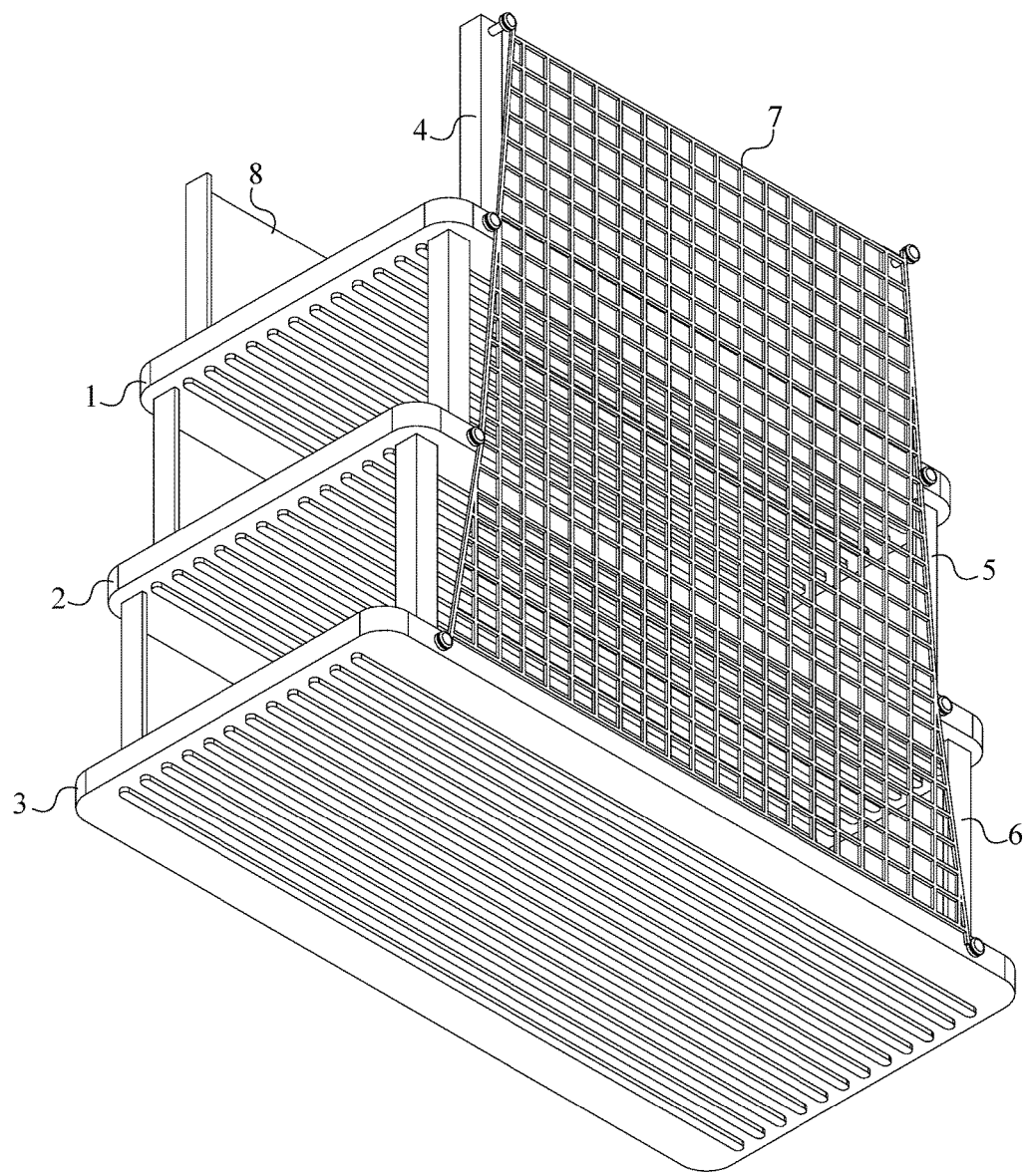
FIG. 2 is a rear perspective view of the present invention.

Referring to FIG. 2, the lower support frame 6 suspends the center shelf 2 and the top shelf 1 over the bottom shelf 3. As such, the bottom shelf 3 is terminally attached to the lower support frame 6. Similarly, the center shelf 2 is terminally attached to the lower support frame 6, opposite the bottom shelf 3. This offsets the center shelf 2 from the bottom shelf 3, creating a space enclosed by the lower support frame 6 that can be used to store grocery bags. The center support frame 5 suspends the top shelf 1 over the center shelf 2 and the bottom shelf 3. As such, the center support frame 5 is terminally attached to the center shelf 2, opposite lower support frame 6. Thus, the center support frame 5 rests on top of the center shelf 2. The top shelf 1 is terminally attached to the center support frame 5, opposite the center shelf 2. As a result, the center support frame 5 offsets the top shelf 1 from the center shelf 2, thereby creating a level platform for holding grocery bags. Finally, the upper support frame 4 is terminally attached to the top shelf 1, opposite the center support frame 5. In the preferred implementation, the upper support frame 4 is configured to extend beyond the top edge the rear seats of the SUV. As a result, the top-level barrier 8 is provided to prevent grocery bags from falling onto the rear seats under heavy braking. More specifically, the top-level barrier 8 is laterally mounted to the upper support frame 4.

Referring back to FIG. 8, the in the preferred embodiment, the top-level barrier 8 is a clear acrylic sheet allowing the driver to see out of the rear window of the SUV. Whereas the top-level barrier 8 restrains the grocery bags placed on the top shelf 1, the rear seats restrain the grocery bags placed on the center shelf 2 and the bottom shelf 3. In contrast, the safety net 7 restrains the grocery bags placed on the top shelf 1, the center shelf 2, and the bottom shelf 3. As such, an upper portion 71 of the safety net 7 is tensionably attached to the upper support frame 4, opposite the top-level barrier 8. Similarly, a central portion 73 of the safety net 7 is tensionably attached to the center shelf 2. Finally, a lower portion 75 of the safety net 7 is tensionably attached to the bottom shelf 3. Preferably, the safety net 7 hooks onto the back of the present invention and restrains the grocery bags when the SUV starts to accelerate. To increase the structural rigidity and the overall strength, the undersides of the top shelf 1, the center shelf 2, and the bottom shelf 3 are preferably ribbed. Alternately, any form of structural reinforcement may be utilized. The present invention is also configured to conform to the shape of the cabin and utilize all of the available space in the trunk. Generally, most SUVs have cabins that slant inwards and taper in the vertical direction. Thus, to conform to the shape of the cabin, the top shelf 1, the center shelf 2, and the bottom shelf 3 are sized successively smaller in the vertical direction. As a result, the sides of the cabin form a barrier which restrains the grocery bags within the present invention when the SUV is making a turn.

The present invention is designed to be retrofitted into the trunk of the SUV. Thus, the top shelf 1, the center shelf 2, and the bottom shelf 3 can be disassembled or reassembled in place. Once the top shelf 1, the center shelf 2, and the bottom shelf 3 are emptied, the user can easily remove the present invention from the trunk.

Figure 3:
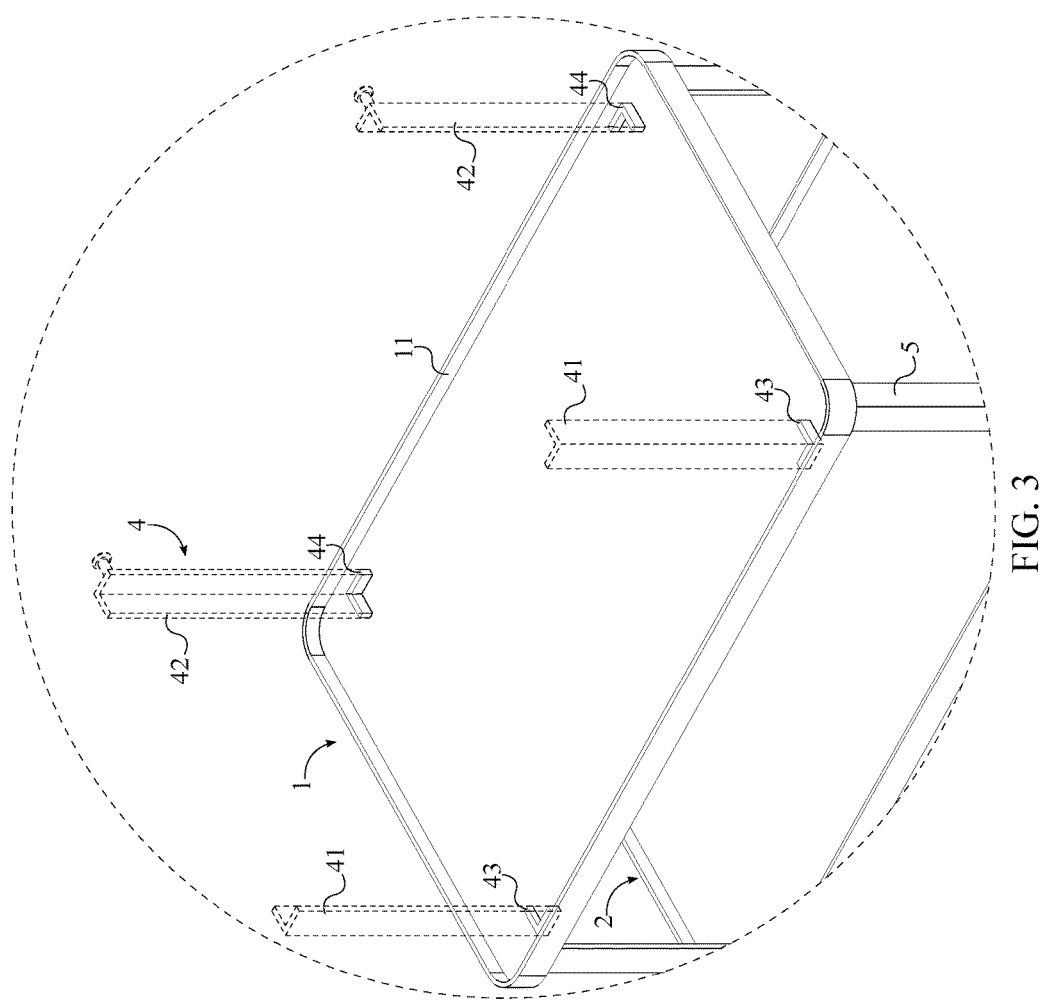
FIG. 3 is a detail view of circle 3 in FIG. 1 illustrating the upper support frame mounted into the first pair of slots and the second pair of slots.
Figure 8:
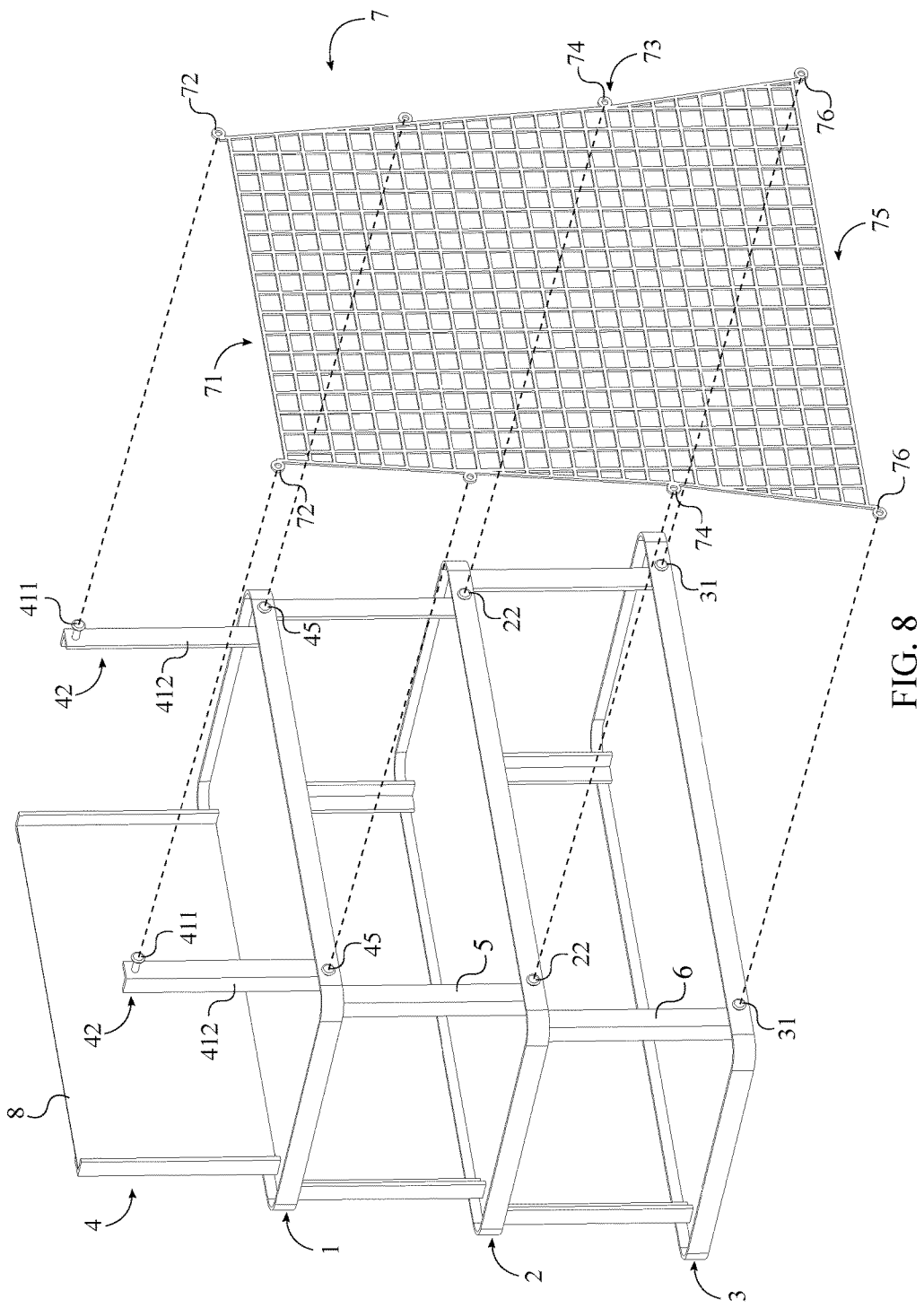
FIG. 8 is an exploded view illustrating the position of the safety net.

Referring to FIG. 3 and FIG. 8, the upper support frame 4 comprises a pair of barrier-supporting angled columns 41, a pair of net-supporting angled columns 42, a first pair of slots 43, a second pair of slots 44, and a pair of upper buttons 45. The pair of barrier-supporting angled columns 41 allows the top-level barrier 8 to be positioned in front of the top shelf 1. Similarly, the pair of net-supporting angled columns 42 positions the safety net 7 behind the top shelf 1 able to restrain the grocery bags from falling out of the top shelf 1. In the preferred embodiment, a portion of the safety net 7 positioned between the upper portion 71 and the central portion 73 attaches to the top shelf 1. As such, the safety net 7 comprises a pair of upper secondary slits 78 capable of hooking onto the pair of upper buttons 45. The first pair of slots 43 and the second pair of slots 44 are connected normal onto the top shelf 1. To maximize the space available for the grocery bags, the first pair of slots 43 and the second pair of slots 44 are positioned opposite each other across the top shelf 1. Each of the pair of barrier-supporting angled columns 41 is mounted into a corresponding slot from the first pair of slots 43. More specifically, each of the pair of barrier-supporting angled columns 41 mounts vertically into the corresponding slot. Similarly, each of the pair of net-supporting angled columns 42 is mounted into a corresponding slot from the second pair of slots 44. More specifically, each of the pair of net-supporting angled columns 42 mounts vertically into the corresponding slot. Both the pair of barrier-supporting angled columns 41 and the pair of net-supporting angled columns 42 are secured inside the first pair of slots 43 and the second pair of slots 44 by gravity. As a result, to disassemble the present invention, the user can simply lift the pair of barrier-supporting angled columns 41 and the pair of net-supporting angled columns 42 out of the first pair of slots 43 and the second pair of slots 44. The pair of upper secondary slits 78 is peripherally positioned onto the safety net 7, offset from the upper portion 71. This positions the pair of upper secondary slits 78 adjacent to the top shelf 1. Further, the pair of upper buttons 45 is peripherally mounted to the top shelf 1. As such, a corresponding slit from the pair of upper secondary slits 78 is attached onto each of the pair of upper buttons 45. This creates a releasable connection between the safety net 7 and the top shelf 1.

Referring to FIG. 1 and FIG. 8, in the preferred embodiment of the present invention, the pair of barrier-supporting angled columns 41 and the pair of net-supporting angled columns 42 are elongated L-shaped columns. Consequently, the first pair of slots 43 and the second pair of slots 44 is an L-shaped extrusion with a recessed center. Alternately, the first pair of slots 43 and the second pair of slots 44 may be L-shaped extrusions that extend out of the top shelf 1. In this case, the pair of barrier-supporting angled columns 41 and the pair of net-supporting angled columns 42 may be hollow to receive the L-shaped extrusions. Each of the pair of net-supporting angled columns 42 comprises a button 411 and a prismatic body 412. The safety net 7 comprises a pair of upper slits 72. The pair of upper slits 72 is peripherally positioned onto the upper portion 71 of the safety net 7. Preferably, each of the pair of upper slits 72 is made of a knotted strand of fabric formed into a circular loop. The preferred button 411 is circular flange mounted onto a cylindrical tube. The button 411 is laterally mounted onto the prismatic body 412. More specifically, the button 411 is positioned offset from the top shelf 1 along the prismatic body 412. This allows the safety net 7 to hang behind the grocery bags placed on the top shelf 1, preventing the grocery bags from falling out of the top shelf 1. Further, a corresponding slit from the pair of upper slits 72 is attached onto the button 411 of each of the pair of net-supporting angled columns 42. More specifically, the slit ties around the button 411 and is held in place by the flange.

The top shelf 1 is constructed with a top lip 11 for containing liquid spills. As such, the top lip 11 is perimetrically connected around the top shelf 1. To position the top lip 11 to face upwards, the top lip 11 is oriented away from the center shelf 2.

Figure 4:
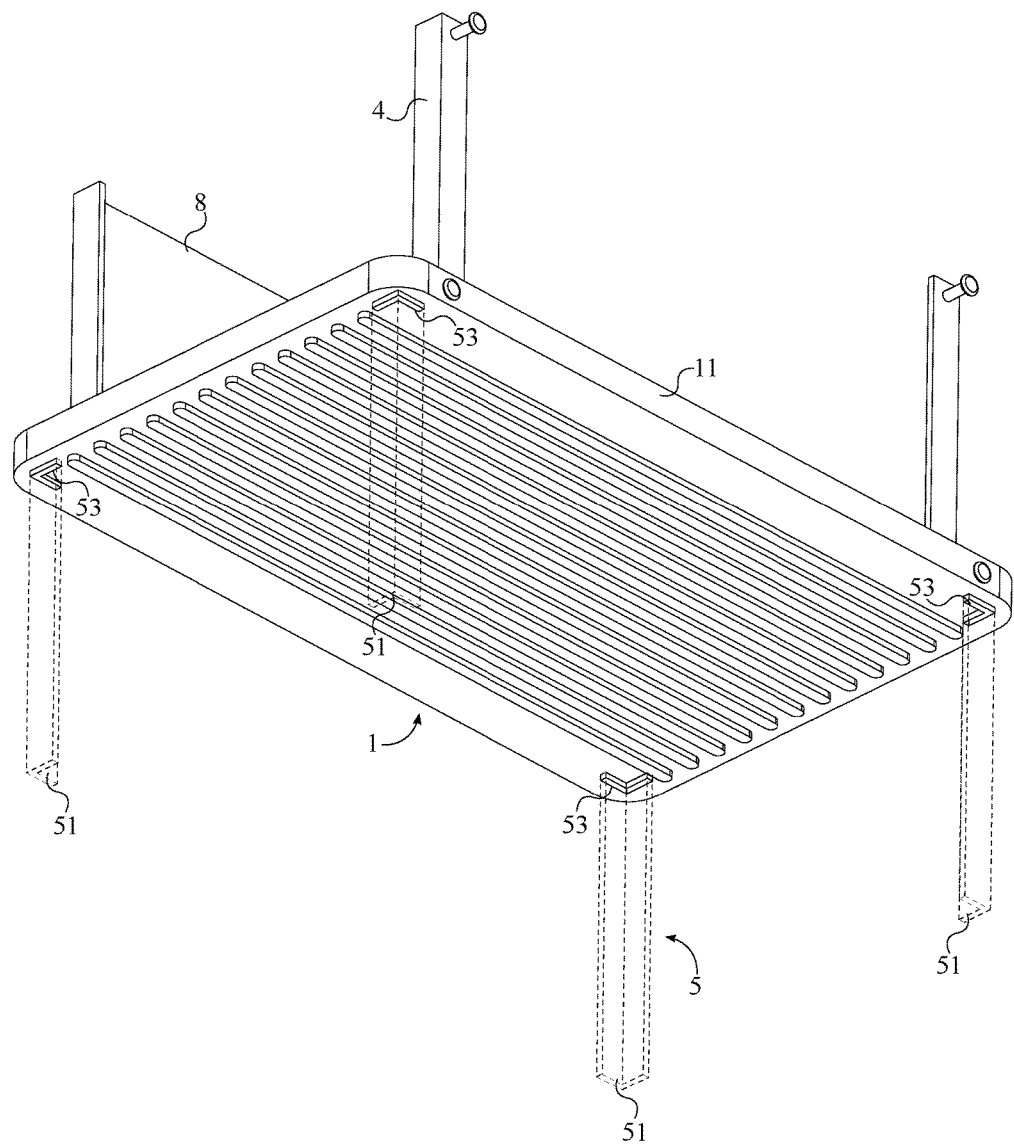
FIG. 4 is a top perspective view illustrating the center support frame mounted into the plurality of third slots.
Figure 5:
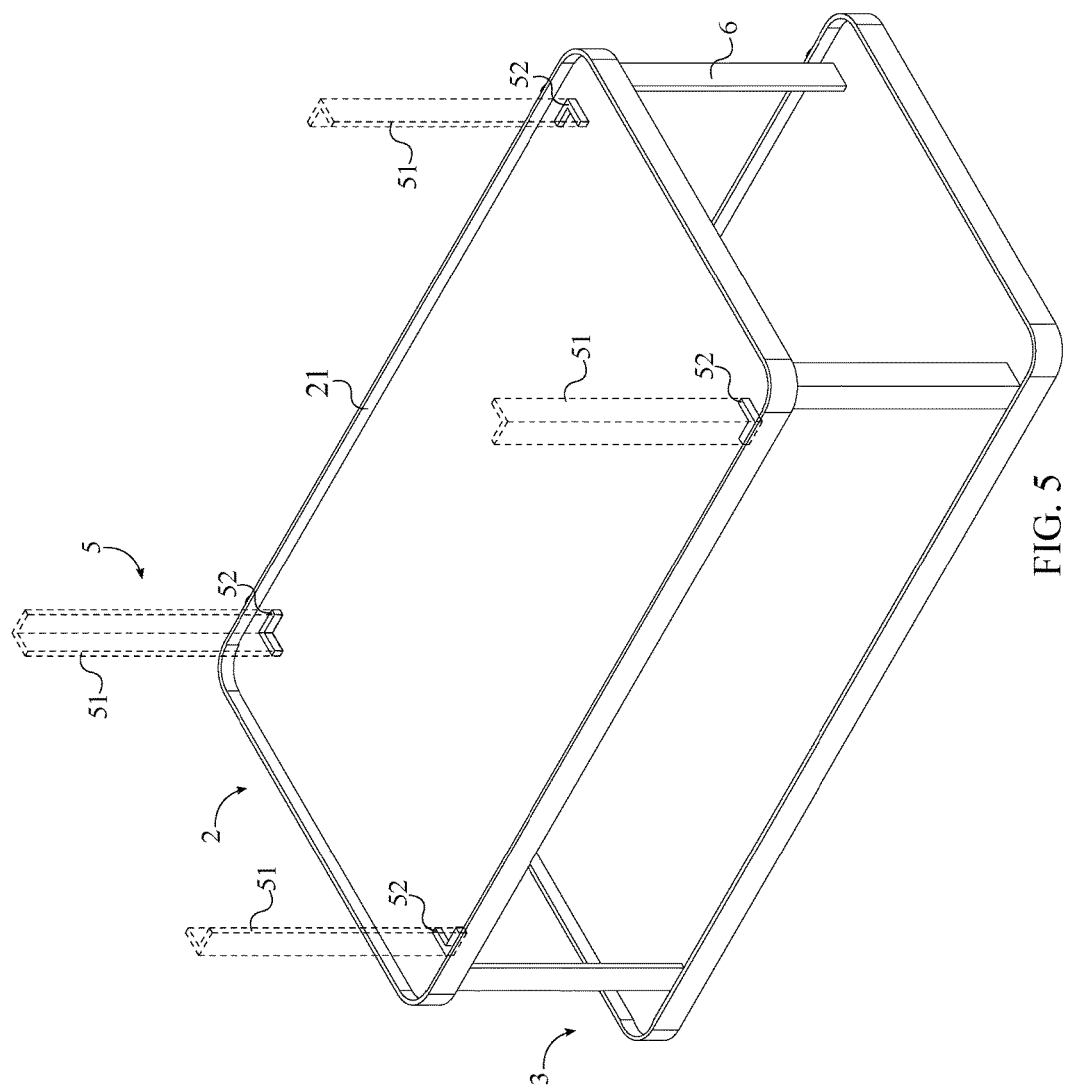
FIG. 5 is a bottom perspective view illustrating the center support frame mounted into the plurality of fourth slots.

Referring to FIG. 4 and FIG. 5, like the upper support frame 4, the center support frame 5 is releasably mounted onto the top shelf 1 and the center shelf 2. The center support frame 5 comprises a plurality of center angled columns 51, a plurality of third slots 52, and a plurality of fourth slots 53. Each of the plurality of center angled columns 51 is a solid L-shaped column made of rigid plastics. Similarly, the plurality of third slots 52 and the plurality of fourth slots 53 are L-shaped extrusions with a recessed center. Alternately, the third pair of slots 52 and the fourth pair of slots 53 may be L-shaped extrusions that extend out of the center shelf 2 and the top shelf 1 respectively. In this case, the plurality of center angled columns 51 may be hollow to receive the L-shaped extrusions. The plurality of third slots 52 is connected normal onto the center shelf 2. Once mounted, the plurality of center angled columns 51 is perpendicularly oriented in relation to the center shelf 2. Additionally, the plurality of third slots 52 is peripherally positioned on the center shelf 2. More specifically, each of the plurality of third slots 52 is positioned adjacent to a corner of the center shelf 2. This maximizes the space between the plurality of center angled columns 51 for storing grocery bags. The top shelf 1 engages the plurality of center angled columns 51 via the plurality of fourth slots 53. As such, the plurality of fourth slots 53 is connected normal onto the top shelf 1. Like the plurality of third slots 52, the plurality of fourth slots 53 is peripherally positioned on the top shelf 1. Each of the plurality of center angled columns 51 is terminally mounted into a corresponding slot from the plurality of third slots 52. In the preferred configuration, gravity presses the plurality of center angled columns 51 into the plurality of third slots 52, thereby preventing the plurality of center angled columns 51 from detaching from the center shelf 2. Further, each of the plurality of center angled columns 51 is terminally mounted into a corresponding slot from the plurality of fourth slots 53, opposite the center shelf 2. The plurality of center angled columns 51 is held in place within the plurality of fourth slots 53 by the weight of the top shelf 1 and the upper support frame 4 pressing down on the plurality of center angled columns 51.

Referring to FIG. 4 and FIG. 8, a pair of center buttons 22 allows the safety net 7 to engage to the center shelf 2.

Accordingly, the safety net 7 comprises a pair of center slits 74 that hook onto the pair of center buttons 22. Preferably, the pair of center slits 74 is peripherally positioned onto the central portion 73 of the safety net 7. More specifically, each of pair of center slits 74 is positioned on the opposite end of the center shelf 2. A corresponding slit from the pair of center slits 74 is attached onto each of the pair of center buttons 22. This eliminates slack in the safety net 7 and allows the safety net 7 to tensionably connect to the center shelf 2. Thus, the safety net 7 must be stretched in both the vertical and the horizontal directions to successfully engage the top shelf 1 and the center shelf 2. As a result, the safety net 7 can successfully restrain the grocery bags placed on the center shelf 2.

The center shelf 2 is also constructed with a center lip 21 for containing spills. As such, the center lip 21 is perimetrically connected around the center shelf 2. Further, the center lip 21 is oriented away from the bottom shelf 3. This creates a recessed area in the center shelf 2 capable of holding liquid spills therein.

Figure 6:
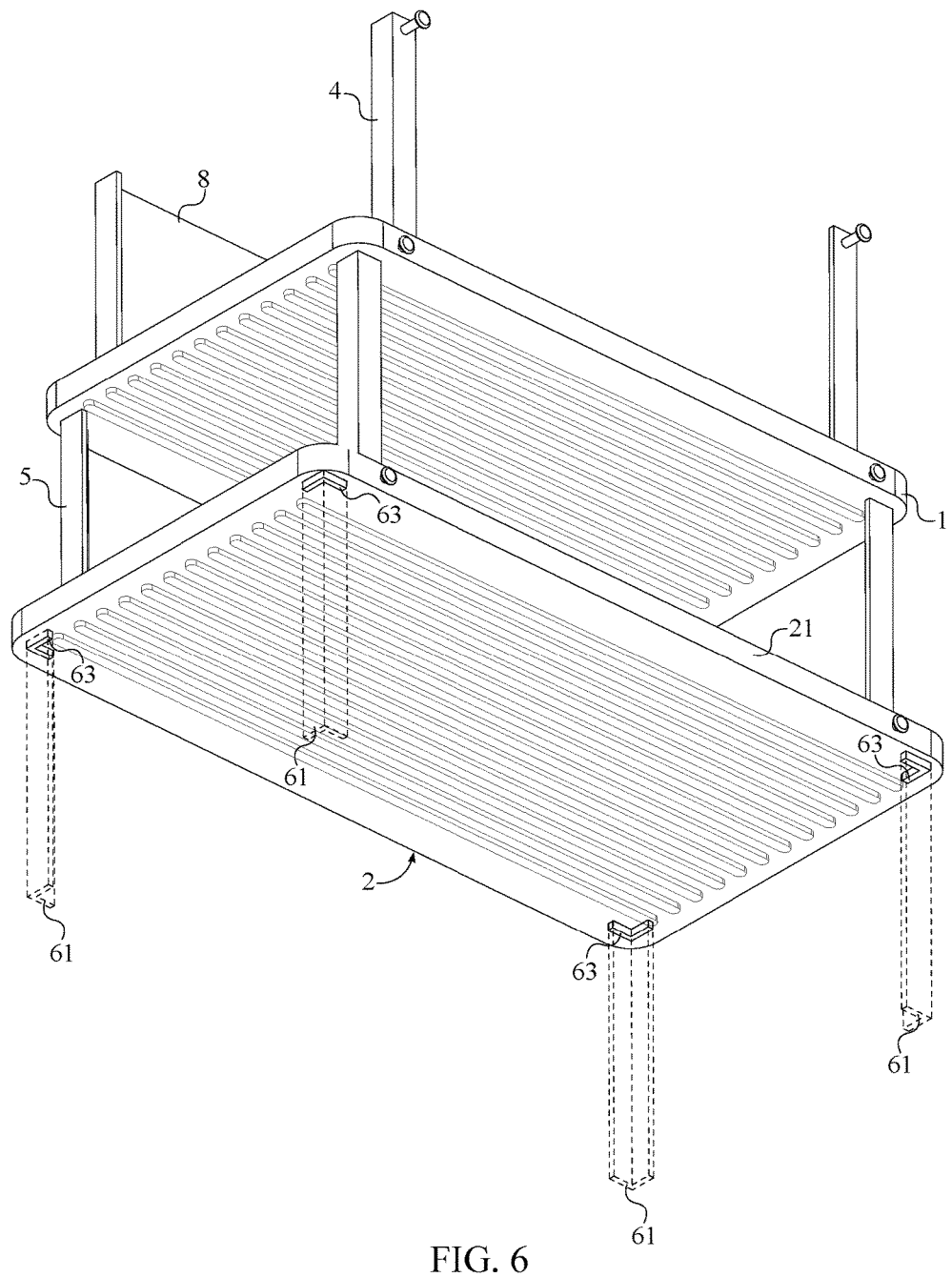
FIG. 6 is a top perspective view illustrating the lower support frame mounted into the plurality of fifth slots.
Figure 7:
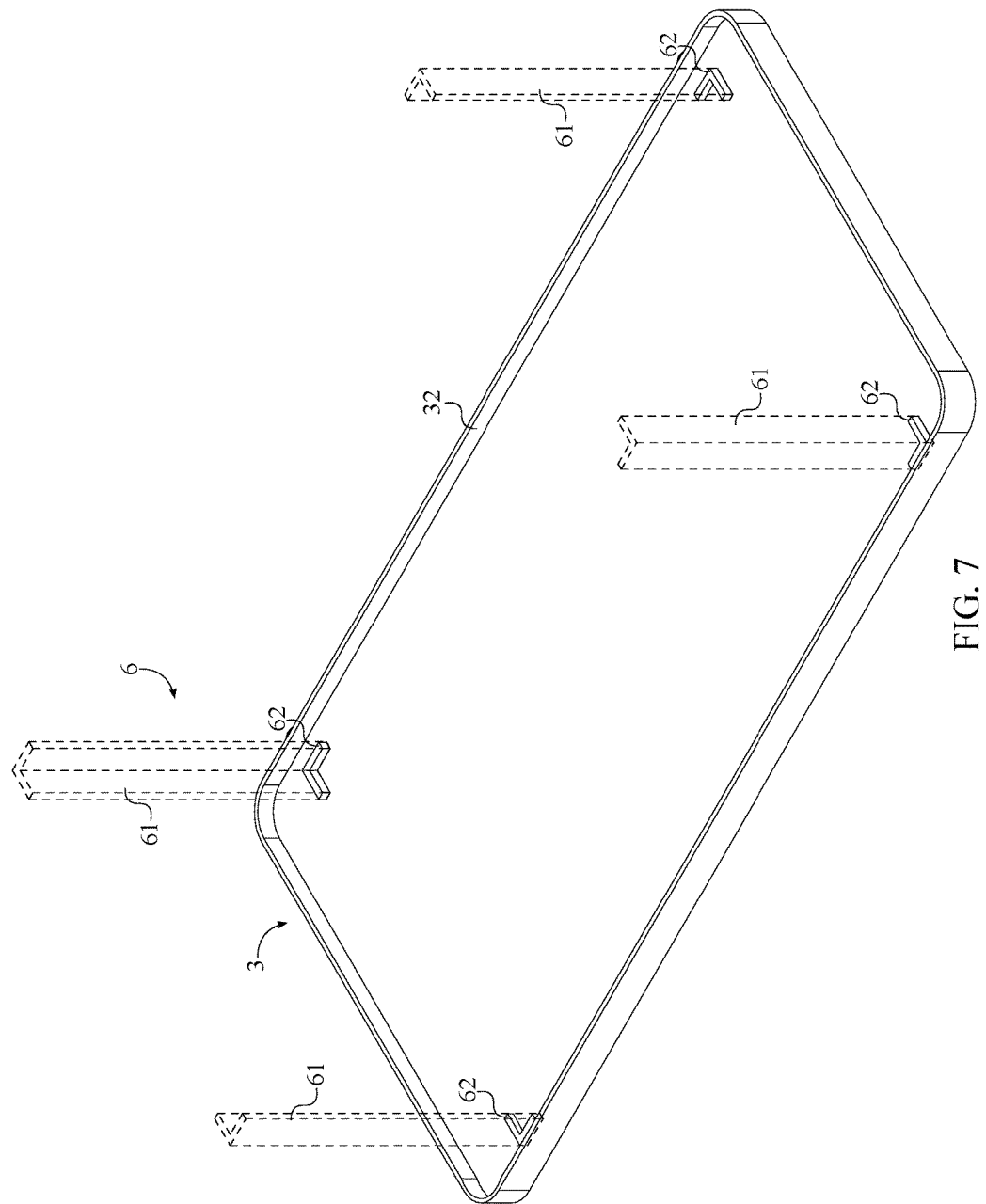
FIG. 7 is a bottom perspective view illustrating the lower support frame mounted into the plurality of sixth slots.

Referring to FIG. 6 and FIG. 7, the lower support frame 6 vertically offsets the center shelf 2 from the bottom shelf 3. The space created between the center shelf 2 and bottom shelf 3 is used to store grocery bags. As such, the lower support frame 6 comprises a plurality of lower angled columns 61, a plurality of fifth slots 62, and a plurality of sixth slots 63. The plurality of fifth slots 62 is connected normal onto the bottom shelf 3. Preferably, the plurality of fifth slots 62 is peripherally positioned on the bottom shelf 3. More specifically, each of the plurality of fifth slots 62 is positioned adjacent to a corner of the bottom shelf 3. Similarly, the plurality of sixth slots 63 is connected normal onto the center shelf 2. Further, the plurality of sixth slots 63 is peripherally positioned on the center shelf 2. More specifically, each of the plurality of sixth slots 63 is positioned adjacent to a corner of the center shelf 2. This maximizes the storage capacity of both the center shelf 2 and the bottom shelf 3.

The plurality of lower angled columns 61 is mounted in a manner which allows it to be easily disassembled. More specifically, each of the plurality of lower angled columns 61 is terminally mounted into a corresponding slot from the plurality of fifth slots 62. In the preferred embodiment, the plurality of fifth slots 62 is an L-shaped extrusion with a recessed center. Alternately, the pair fifth of slots 62 may be L-shaped extrusions that extend out of the bottom shelf 3. In this case, the plurality of lower angled columns 61 may be hollow to receive the L-shaped extrusions. The plurality of lower angled columns 61 mounts perpendicular to the bottom shelf 3 and is held in place by gravity. Similarly, each of the plurality of lower angled columns 61 is terminally mounted into a corresponding slot from the plurality of sixth slots 63, opposite the bottom shelf 3. Preferably, each of the plurality of sixth slots 63 is a L-shaped extrusion with a recessed center. Alternately, the sixth pair of slots 63 may be L-shaped extrusions that extend out of the center shelf 2. As mentioned, the plurality of lower angled columns 61 may be hollow to receive the L-shaped extrusions. The plurality of lower angled columns 61 mounts perpendicularly into the plurality of sixth slots 63. The weight of the structure above the center shelf 2 presses that the plurality of lower angled columns 61 into the plurality of sixth slots 63. This also allows the center shelf 2 and the plurality of lower angled columns 61 to be easily disassembled. In the preferred embodiment, the plurality of lower angled columns 61 is a solid prismatic angled column capable of fitting easily into the plurality of fifth slots 62 and the plurality of sixth slots 63.

Referring once more to FIG. 8, a pair of lower buttons 31 attaches the safety net 7 to the bottom shelf 3. More specifically, the safety net 7 comprises a pair of lower slits 76 that hook onto the pair of lower buttons 31 on the bottom shelf 3. The pair of lower slits 76 is peripherally positioned onto the lower portion 75 of the safety net 7. The pair of lower buttons 31 is peripherally mounted to the bottom shelf 3. A corresponding slit from the pair of lower slits 76 is attached onto each of the pair of lower buttons 31.

Referring back to FIG. 1 and FIG. 6, the bottom shelf 3 is constructed with a bottom lip 32 for containing spills. The bottom lip 32 is perimetrically connected around the bottom shelf 3, thereby retaining liquids within the confines of the bottom shelf 3. The bottom lip 32 is oriented towards the center shelf 2, which causes the bottom lip 32 to point upwards. This creates a recess which retains liquids within the confines of the bottom shelf 3.

Finally, a cooler-supporting platform 9 permits a cooler to be slid on and off the bottom shelf 3. As such, the cooler-supporting platform 9 is situated onto the bottom shelf 3. The cooler-supporting platform 9 is encircled by the bottom lip 32. Further, the height of the cooler-supporting platform 9 is equal to the height of the bottom lip 32. As such, a cooler can be easily moved on and off the cooler-supporting platform 9 without the bottom lip 32 interfering with the cooler's movement.

Although the invention has been explained in relation to its preferred embodiment, it is to be understood that many other possible modifications and variations can be made without departing from the spirit and scope of the invention as hereinafter claimed.

What is claimed is:

1. A trunk mounted storage rack for sport utility vehicles comprises:
    a top shelf;
    a center shelf;
    a bottom shelf;
    an upper support frame;
    a center support frame;
    a lower support frame;
    a safety net;
    a top-level barrier;
    the bottom shelf being terminally attached to the lower support frame;
    the center shelf being terminally attached to the lower support frame, opposite the bottom shelf;
    the center support frame being terminally attached to the center shelf, opposite the lower support frame;
    the top shelf being terminally attached to the center support frame, opposite the center shelf;
    the upper support frame being terminally attached to the top shelf, opposite the center support frame;
    the top-level barrier being laterally mounted to the upper support frame;
    an upper portion of the safety net being tensionably attached to the upper support frame, opposite the top-level barrier;
    a central portion of the safety net being tensionably attached to the top shelf and the center shelf; and
    a lower portion of the safety net being tensionably attached to the bottom shelf.

2. The trunk mounted storage rack for sport utility vehicles as claimed in claim 1 comprises:

the undersides of the top shelf, the center shelf, and the bottom shelf being ribbed.

3. The trunk mounted storage rack for sport utility vehicles as claimed in claim 1 comprises:
the upper support frame comprises a pair of barrier-supporting angled columns, a pair of net-supporting angled columns, a first pair of slots, a second pair of slots, and a pair of upper buttons;
the safety net comprises a pair of upper secondary slits;
the first pair of slots and the second pair of slots being connected normal onto the top shelf;
the first pair of slots and the second pair of slots being positioned opposite each other across the top shelf;
each of the pair of barrier-supporting angled columns being mounted into a corresponding slot from the first pair of slots;
each of the pair of net-supporting angled columns being mounted into a corresponding slot from the second pair of slots;
the pair of upper secondary slits being peripherally positioned onto the safety net, offset from the upper portion;
the pair of upper buttons being peripherally mounted to the top shelf; and
a corresponding slit from the pair of upper secondary slits being attached onto each of the pair of upper buttons.

4. The trunk mounted storage rack for sport utility vehicles as claimed in claim 2 comprises:
each of the pair of net-supporting angled columns comprises a button and a prismatic body;
the safety net comprises a pair of upper slits;
the pair of upper slits being peripherally positioned onto the upper portion of the safety net;
the button being laterally mounted onto the prismatic body;
the button being positioned offset from the top shelf along the prismatic body; and
a corresponding slit from the pair of upper slits being attached onto the button of each of the pair of net-supporting angled columns.

5. The trunk mounted storage rack for sport utility vehicles as claimed in claim 1 comprises:
a top lip;
the top lip being perimetrically connected around the top shelf; and
the top lip being oriented away from the center shelf.

6. The trunk mounted storage rack for sport utility vehicles as claimed in claim 1 comprises:
the center support frame comprises a plurality of center angled columns, a plurality of third slots, and a plurality of fourth slots;
the plurality of third slots being connected normal onto the center shelf;
the plurality of third slots being peripherally positioned on the center shelf;
the plurality of fourth slots being connected normal onto the top shelf;
the plurality of fourth slots being peripherally positioned on the top shelf;
each of the plurality of center angled columns being terminally mounted into a corresponding slot from the plurality of third slots; and
each of the plurality of center angled columns being terminally mounted into a corresponding slot from the plurality of fourth slots, opposite the center shelf.

7. The trunk mounted storage rack for sport utility vehicles as claimed in claim 1 comprises:
a pair of center buttons;
the safety net comprises a pair of center slits;
the pair of center slits being peripherally positioned onto the central portion of the safety net;
the pair of center buttons being peripherally mounted to the center shelf; and
a corresponding slit from the pair of center slits being attached onto each of the pair of center buttons.

8. The trunk mounted storage rack for sport utility vehicles as claimed in claim 1 comprises:
a center lip;
the center lip being perimetrically connected around the center shelf; and
the center lip being oriented away from the bottom shelf.

9. The trunk mounted storage rack for sport utility vehicles as claimed in claim 1 comprises:
the lower support frame comprises a plurality of lower angled columns, a plurality of fifth slots, and a plurality of sixth slots;
the plurality of fifth slots being connected normal onto the bottom shelf;
the plurality of fifth slots being peripherally positioned on the bottom shelf;
the plurality of sixth slots being connected normal onto the center shelf;
the plurality of sixth slots being peripherally positioned on the center shelf;
each of the plurality of lower angled columns being terminally mounted into a corresponding slot from the plurality of fifth slots; and
each of the plurality of lower angled columns being terminally mounted into a corresponding slot from the plurality of sixth slots, opposite the bottom shelf.

10. The trunk mounted storage rack for sport utility vehicles as claimed in claim 1 comprises:
a pair of lower buttons;
the safety net comprises a pair of lower slits;
the pair of lower slits being peripherally positioned onto the lower portion of the safety net;
the pair of lower buttons being peripherally mounted to the bottom shelf; and
a corresponding slit from the pair of lower slits being attached onto each of the pair of lower buttons.

11. The trunk mounted storage rack for sport utility vehicles as claimed in claim 1 comprises:
a bottom lip;
the bottom lip being perimetrically connected around the bottom shelf; and
the bottom lip being oriented towards the center shelf.

12. The trunk mounted storage rack for sport utility vehicles as claimed in claim 10 comprises:
a cooler-supporting platform;
the cooler-supporting platform being situated onto the bottom shelf;
the cooler-supporting platform being encircled by the bottom lip; and
a height of the cooler-supporting platform being equal to a height of the bottom lip.

13. A trunk mounted storage rack for sport utility vehicles comprises:
a top shelf;
a center shelf;
a bottom shelf;
an upper support frame;
a center support frame;
a lower support frame;
a safety net;
a top-level barrier;

the bottom shelf being terminally attached to the lower support frame;

the center shelf being terminally attached to the lower support frame, opposite the bottom shelf;

the center support frame being terminally attached to the center shelf, opposite the lower support frame;

the top shelf being terminally attached to the center support frame, opposite the center shelf;

the upper support frame being terminally attached to the top shelf, opposite the center support frame;

the top-level barrier being laterally mounted to the upper support frame;

an upper portion of the safety net being tensionably attached to the upper support frame, opposite the top-level barrier;

a central portion of the safety net being tensionably attached to the center shelf;

a lower portion of the safety net being tensionably attached to the bottom shelf; and the undersides of the top shelf, the center shelf, and the bottom shelf being ribbed.

14. The trunk mounted storage rack for sport utility vehicles as claimed in claim 13 comprises:

the upper support frame comprises a pair of barrier-supporting angled columns, a pair of net-supporting angled columns, a first pair of slots, a second pair of slots, and a pair of upper buttons;

the safety net comprises a pair of upper secondary slits;

the first pair of slots and the second pair of slots being connected normal onto the top shelf;

the first pair of slots and the second pair of slots being positioned opposite each other across the top shelf;

each of the pair of barrier-supporting angled columns being mounted into a corresponding slot from the first pair of slots;

each of the pair of net-supporting angled columns being mounted into a corresponding slot from the second pair of slots;

the pair of upper secondary slits being peripherally positioned onto the safety net, offset from the upper portion;

the pair of upper buttons being peripherally mounted to the top shelf; and a corresponding slit from the pair of upper secondary slits being attached onto each of the pair of upper buttons.

15. The trunk mounted storage rack for sport utility vehicles as claimed in claim 13 comprises:

a top lip;

each of the pair of net-supporting angled columns comprises a button and a prismatic body;

the safety net comprises a pair of upper slits;

the pair of upper slits being peripherally positioned onto the upper portion of the safety net;

the button being laterally mounted onto the prismatic body;

the button being positioned offset from the top shelf along the prismatic body;

a corresponding slit from the pair of upper slits being attached onto the button of each of the pair of net-supporting angled columns;

the top lip being perimetrically connected around the top shelf; and the top lip being oriented away from the center shelf.

16. The trunk mounted storage rack for sport utility vehicles as claimed in claim 13 comprises:

the center support frame comprises a plurality of center angled columns, a plurality of third slots, and a plurality of fourth slots;

the plurality of third slots being connected normal onto the center shelf;

the plurality of third slots being peripherally positioned on the center shelf;

the plurality of fourth slots being connected normal onto the top shelf;

the plurality of fourth slots being peripherally positioned on the top shelf;

each of the plurality of center angled columns being terminally mounted into a corresponding slot from the plurality of third slots; and each of the plurality of center angled columns being terminally mounted into a corresponding slot from the plurality of fourth slots, opposite the center shelf.

17. The trunk mounted storage rack for sport utility vehicles as claimed in claim 13 comprises:

a pair of center buttons;

a center lip;

the safety net comprises a pair of center slits;

the pair of center slits being peripherally positioned onto the central portion of the safety net;

the pair of center buttons being peripherally mounted to the center shelf;

a corresponding slit from the pair of center slits being attached onto each of the pair of center buttons;

the center lip being perimetrically connected around the center shelf; and the center lip being oriented away from the bottom shelf.

18. The trunk mounted storage rack for sport utility vehicles as claimed in claim 13 comprises:

the lower support frame comprises a plurality of lower angled columns, a plurality of fifth slots, and a plurality of sixth slots;

the plurality of fifth slots being connected normal onto the bottom shelf;

the plurality of fifth slots being peripherally positioned on the bottom shelf;

the plurality of sixth slots being connected normal onto the center shelf;

the plurality of sixth slots being peripherally positioned on the center shelf;

each of the plurality of lower angled columns being terminally mounted into a corresponding slot from the plurality of fifth slots; and each of the plurality of lower angled columns being terminally mounted into a corresponding slot from the plurality of sixth slots, opposite the bottom shelf.

19. The trunk mounted storage rack for sport utility vehicles as claimed in claim 13 comprises:

a pair of lower buttons;

a bottom lip;

the safety net comprises a pair of lower slits;

the pair of lower slits being peripherally positioned onto the lower portion of the safety net;

the pair of lower buttons being peripherally mounted to the bottom shelf;

a corresponding slit from the pair of lower slits being attached onto each of the pair of lower buttons;

the bottom lip being perimetrically connected around the bottom shelf; and the bottom lip being oriented towards the center shelf.

20. The trunk mounted storage rack for sport utility vehicles as claimed in claim 19 comprises:

a cooler-supporting platform;

the cooler-supporting platform being situated onto the bottom shelf;

the cooler-supporting platform being encircled by the bottom lip; and a height of the cooler-supporting platform being equal to a height of the bottom lip.

* * * * *